(12) United States Patent
Ryu et al.

(10) Patent No.: US 10,874,889 B2
(45) Date of Patent: Dec. 29, 2020

(54) BATTERY MODULE AND BATTERY PACK WITH IMPROVED SAFETY

(71) Applicant: LG CHEM, LTD., Seoul (KR)

(72) Inventors: Jae-Uk Ryu, Daejeon (KR); Dal-Mo Kang, Daejeon (KR); Su-Chang Kim, Daejeon (KR); Jeong-O Mun, Daejeon (KR); Ji-Su Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 42 days.

(21) Appl. No.: 16/341,409

(22) PCT Filed: Jan. 3, 2018

(86) PCT No.: PCT/KR2018/000138
§ 371 (c)(1),
(2) Date: Apr. 11, 2019

(87) PCT Pub. No.: WO2018/230797
PCT Pub. Date: Dec. 20, 2018

(65) Prior Publication Data
US 2020/0038698 A1 Feb. 6, 2020

(30) Foreign Application Priority Data
Jun. 16, 2017 (KR) .................. 10-2017-0076763

(51) Int. Cl.
| | | |
|---|---|---|
| A62C 3/16 | (2006.01) |
| H01M 10/635 | (2014.01) |
| A62C 37/14 | (2006.01) |
| H01M 2/34 | (2006.01) |
| H01M 10/42 | (2006.01) |

(52) U.S. Cl.
CPC ............. *A62C 3/16* (2013.01); *A62C 37/14* (2013.01); *H01M 2/348* (2013.01); *H01M 10/4207* (2013.01); *H01M 10/635* (2015.04); *H01M 2200/10* (2013.01)

(58) Field of Classification Search
None
See application file for complete search history.

(56) References Cited

U.S. PATENT DOCUMENTS

| | | | |
|---|---|---|---|
| 10,651,438 B2 * | 5/2020 | Lee .................. | B60L 58/00 |
| 2013/0288100 A1 | 10/2013 | Dunkel et al. | |
| 2014/0014376 A1 | 1/2014 | Schaefer | |
| 2014/0170447 A1 | 6/2014 | Woehrle et al. | |
| 2014/0186668 A1 | 7/2014 | Jung et al. | |
| 2015/0171480 A1 | 6/2015 | Seo et al. | |
| 2017/0165513 A1 | 6/2017 | Li | |
| 2018/0248160 A1 | 8/2018 | Lee | |

FOREIGN PATENT DOCUMENTS

| | | |
|---|---|---|
| CN | 103825059 A | 5/2014 |
| CN | 104091904 A | 10/2014 |
| CN | 205508970 U | 8/2016 |
| CN | 205564849 U | 9/2016 |
| CN | 106730498 A | 5/2017 |
| DE | 10 2010 034 826 A1 | 2/2012 |
| DE | 10 2011 075 318 A1 | 11/2012 |
| JP | 4186500 B2 | 11/2008 |
| JP | 2009-99322 A | 5/2009 |
| JP | 2014-49226 A | 3/2014 |
| JP | 2014-144033 A | 8/2014 |
| JP | 2017-60805 A | 3/2017 |
| KR | 10-0852727 B1 | 8/2008 |
| KR | 10-2013-0028023 A | 3/2013 |
| KR | 10-1270796 B1 | 6/2013 |
| KR | 10-1500222 B1 | 3/2015 |
| KR | 10-2016-0032843 A | 3/2016 |
| KR | 10-2017-0061582 A | 6/2017 |
| KR | 10-2017-0067014 A | 6/2017 |
| WO | WO 2010/098067 A1 | 9/2010 |

OTHER PUBLICATIONS

International Search Report for PCT/KR2018/000138 (PCT/ISA/210) dated Jun. 26, 2018.
English translation of KR-10-2017-0067014 (previously filed on Apr. 11, 2019), publication date Jun. 15, 2017.
English translation of KR-10-0852727 (Previously filed Apr. 11, 2019), Publication date Aug. 19, 2008.

\* cited by examiner

*Primary Examiner* — Ladan Mohaddes
(74) *Attorney, Agent, or Firm* — Birch, Stewart, Kolasch & Birch, LLP

(57) ABSTRACT

A battery module including a cell stack formed by stacking a plurality of battery cells; a module frame coupled to one side or both sides of the cell stack; and a fire extinguishing unit accommodated in the module frame to eject a fire extinguishing agent at a reference temperature or above.

11 Claims, 7 Drawing Sheets

BATTERY MODULE AND BATTERY PACK WITH IMPROVED SAFETY

TECHNICAL FIELD

The present disclosure relates to a battery module with improved safety, and more particularly, to a battery module with improved safety against ignition and explosion by including a fire extinguishing unit containing a fire extinguishing agent therein.

The present application claims priority to Korean Patent Application No. 10-2017-0076763 filed on Jun. 16, 2017 in the Republic of Korea, the disclosures of which are incorporated herein by reference.

BACKGROUND ART

As portable electric products such as video cameras, cellular phones and portable PCs are used more broadly, the importance of secondary batteries mainly used as a driving power source therefor is increasing.

A secondary battery capable of charging and discharging, different from a primary battery cannot be recharged is being actively studied in high-tech fields such as digital cameras, cellular phones, laptop computers, power tools, electric bicycles, electric vehicles, hybrid electric vehicles and mass-capacity power storage devices.

In particular, a lithium secondary battery has a high energy density per unit weight and allows rapid charging, compared to other secondary batteries such as lead storage batteries, nickel-cadmium batteries, nickel-hydrogen batteries and nickel-zinc batteries, and thus it is used more and more.

The lithium secondary battery has an operating voltage of 3.6V or above. The lithium secondary battery is used as a power source for a portable electronic device, or a plurality of lithium secondary batteries are connected in series or in parallel and used for a high output electric vehicle, a hybrid electric vehicle, a power tool, an electric bicycle, a power storage device or a UPS.

The lithium secondary battery has an operating voltage three times higher than that of a nickel-cadmium battery or a nickel-metal hydride battery and has a high energy density per unit weight. For this reason, the lithium secondary battery tends to be used more and more.

The lithium secondary battery may be classified into a lithium ion battery using a liquid electrolyte and a lithium ion polymer battery using a polymer solid electrolyte depending on an electrolyte type. In addition, the lithium ion polymer battery may be classified into a pure solid lithium ion polymer battery without containing any electrolyte and a lithium ion polymer battery using a gel polymer electrolyte containing an electrolytic solution, depending on a polymer solid electrolyte type.

In the lithium ion battery using a liquid electrolyte, a cylindrical or rectangular metal can is generally used as a container in a welded and sealed form. Since the can-type secondary battery using the metal can as a container has a fixed shape, there is a disadvantage that it restricts the design of an electric product using the can-type secondary battery as a power source, and it is difficult to reduce the volume. Thus, a pouch-type secondary battery prepared by putting an electrode assembly and an electrolyte in a pouch packaging material made of a film and sealing the pouch packaging material has been developed and used.

However, the lithium secondary battery has a risk of explosion when being overheated and thus it is important to secure safety. The lithium secondary battery is overheated due to various factors, one of which is an overcurrent flow above a limit through the lithium secondary battery. If the overcurrent flows, the lithium secondary battery is heated by the Joule heat, so the internal temperature of the battery rises rapidly. In addition, the rapid rise in temperature causes a decomposition reaction of the electrolyte, causing a thermal runaway, which eventually leads to the explosion of the battery. Overcurrent occurs in the case where a sharp metal object penetrates the lithium secondary battery, where the insulation between positive and negative electrodes is destroyed due to the shrinkage of a separator interposed between the positive and negative electrodes, where a rush current is applied to the battery due to abnormality of a charging circuit or a load connected to the outside, or the like.

Thus, the lithium secondary battery is used in combination with a protecting circuit in order to protect the battery against an abnormal situation such as overcurrent, and the protecting circuit generally includes a fuse element for irreversibly disconnecting a line through which a charging or discharging current flows when overcurrent occurs.

FIG. 1 is a circuit diagram for illustrating an arrangement and an operating mechanism of a fuse element provided in a protecting circuit coupled to a battery pack including a lithium secondary battery.

As shown in FIG. 1, in order to protect the battery pack when overcurrent occurs, the protecting circuit includes a fuse element 1, a sensing resistor 2 for sensing overcurrent, a microcontroller 3 for monitoring the occurrence of overcurrent and operating the fuse element 1 when overcurrent occurs, and a switch 4 for switching the inflow of an operating current to the fuse element 1.

The fuse element 1 is installed on a main line connected to an outermost terminal of the battery pack. The main line refers to a wiring through which a charging current or a discharging current flows. In FIG. 1, it is depicted that the fuse element 1 is installed at a high-potential line (Pack+).

The fuse element 1 is a three-terminal element, where two terminals are connected to the main line through which a charging or discharging current flows and one terminal is connected to the switch 4. In addition, the fuse element 1 includes a fuse 1a connected to the main line in series and melted and cut at a certain temperature and a resistor 1b for applying heat to the fuse 1a.

The microcontroller 3 periodically detects the voltage at both ends of the sensing resistor 2 and monitors whether overcurrent occurs. If it is determined that overcurrent occurs, the microcontroller 3 turns on the switch 4. If so, the current flowing on the main line is bypassed to the fuse element 1 and applied to the resistor 1b. Accordingly, the Joule heat generated at the resistor 1b is conducted to the fuse 1a to raise the temperature of the fuse 1a. If the temperature of the fuse 1a rises to the melting temperature, the fuse 1a is melted and broken so that the main line is irreversibly disconnected. If the main line is disconnected, the overcurrent does not flow any more, thereby overcoming the problem caused by the overcurrent.

However, the above conventional technique has several problems. In other words, if the microcontroller 3 is broken, the switch 4 does not turn on even though overcurrent occurs. In this case, a current does not flow into the resistor 1b of the fuse element 1, and thus the fuse element 1 does not operate. Also, a space for disposing the fuse element 1 is separately required inside the protecting circuit, and a program algorithm for controlling the operation of the fuse element 1 must be loaded in the microcontroller 3. Thus, it is disadvantageous that the space efficiency of the protecting circuit is deteriorated and the load of the microcontroller 3 is increased.

DISCLOSURE

Technical Problem

The present disclosure is designed to solve the problems of the related art, and therefore the present disclosure is directed to providing a battery module structure capable of greatly improving the safety of a secondary battery in use by preventing the occurrence of an event such as ignition and explosion without complicating the structure of the battery module.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack formed by stacking a plurality of battery cells; a module frame coupled to one side or both sides of the cell stack; and a fire extinguishing unit accommodated in the module frame and configured to eject a fire extinguishing agent at or above a reference temperature.

The module frame may include: a main frame disposed at a center of the cell stack to accommodate the fire extinguishing unit; and a plurality of sub frames disposed at both sides of the main frame and each sub frame being interposed between adjacent battery cells.

The main frame may have a plurality of ejection holes configured to allow the fire extinguishing agent to be ejected.

The ejection holes may have a tapered shape so that an outlet portion thereof is wider in an upper direction.

Each sub frame may support a sealing portion and an electrode lead of the battery cell.

The fire extinguishing unit may be located in the accommodation space formed in the main frame and respectively contact accommodation portions of two battery cells located at a center portion among the plurality of battery cells of the cell stack.

The fire extinguishing unit may include a fire extinguishing agent configured to evaporate at or above the reference temperature; and an accommodation container configured to accommodate the fire extinguishing agent and break at or above the reference temperature.

Meanwhile, a battery pack according to an embodiment of the present disclosure is implemented to include the battery module, and a pack housing configured to accommodate at least one battery module.

Advantageous Effects

According to an embodiment of the present disclosure, it is possible to ensure the safety of a secondary battery in use by greatly lowering the possibility of occurrence of an event such as ignition and explosion of a battery cell provided in a battery module without complicating the structure of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall configuration of a battery module according to an embodiment of the present disclosure will be described with reference to FIG. 2.

Figure 1:
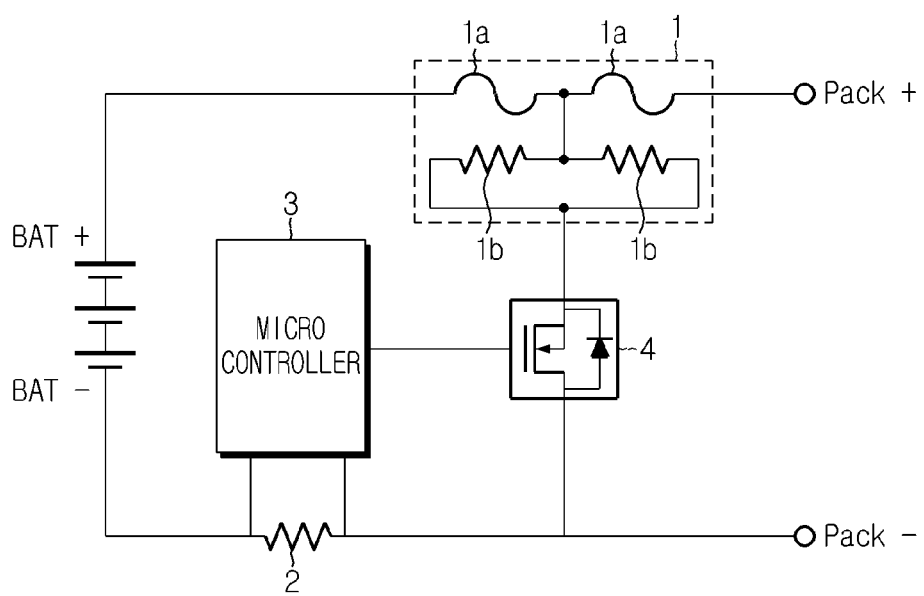
FIG. 1 is a circuit diagram for illustrating an arrangement and an operating mechanism of a fuse element provided in a protecting circuit coupled to a battery module.
Figure 2:
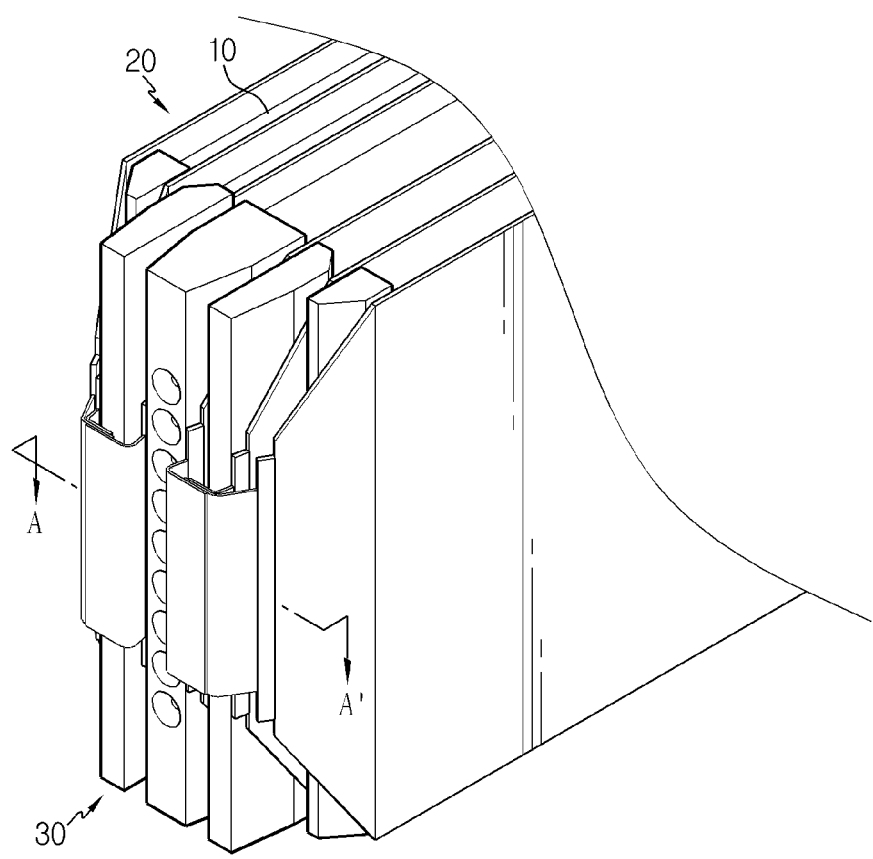
FIG. 2 is a partial perspective view showing a battery module according to an embodiment of the present disclosure.

FIG. 2 is a partial perspective view showing a battery module according to an embodiment of the present disclosure.

Referring to FIG. 2, a battery module according to an embodiment of the present disclosure may include a cell stack 20 formed by stacking a plurality of battery cells 10, a module frame 30 coupled to at least one side of the cell stack 20 and a fire extinguishing unit 40 (see FIG. 6) accommodated in the module frame 30.

Next, the battery cell 10 employed at the present disclosure will be described in detail with reference to FIG. 3.

Figure 3:
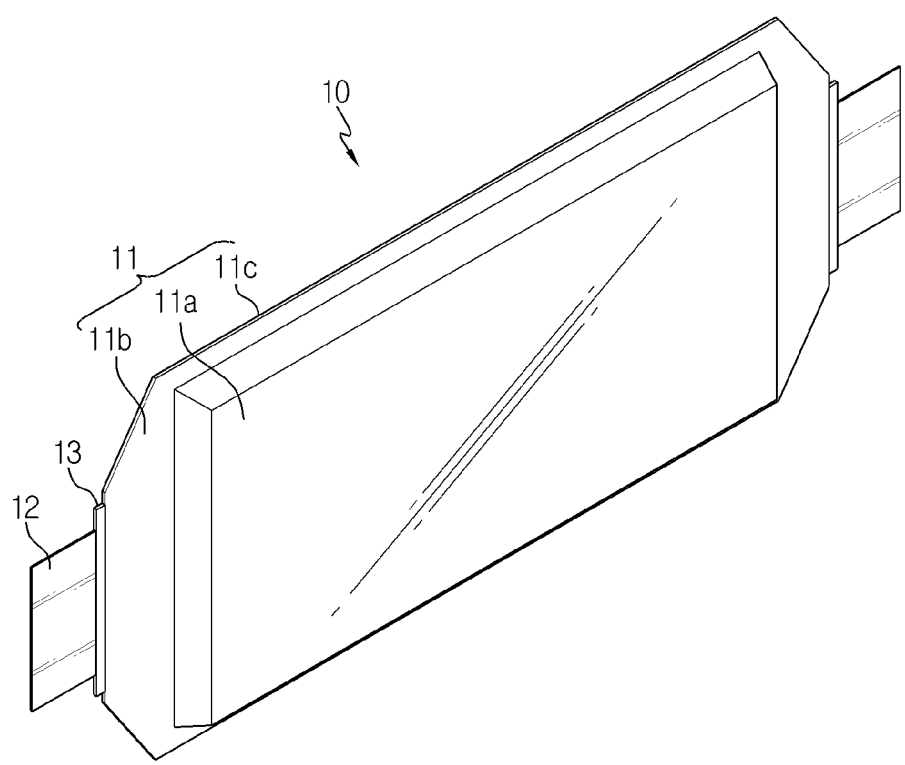
FIG. 3 is a perspective view showing a battery cell employed at the battery module according to an embodiment of the present disclosure.

FIG. 3 is a perspective view showing a battery cell employed at the battery module according to an embodiment of the present disclosure.

Referring to FIG. 3, the battery cell 10 employed at the battery module according to an embodiment of the present disclosure includes an electrode assembly (not shown), a pouch case 11, an electrode lead 12 and a sealant 13.

The electrode assembly (not shown) is configured so that a positive electrode plate, a separator and a negative electrode plate are laminated at least once, and a separator is preferably located at the outermost side in order to secure insulation. The electrode assembly may have various structures such as winding-type, stacking-type and stacking/folding-type structures depending on the embodiment.

The positive electrode plate is configured so that a positive electrode active material is coated on at least one surface of a positive electrode current collector made of a conductive plate. Likewise, the negative electrode plate is configured so that a negative electrode active material is coated on at least one surface of a negative electrode current collector made of a conductive plate.

The positive electrode plate and the negative electrode plate have an uncoated region that is not coated with the positive electrode active material and the negative electrode active material, and the uncoated region functions as an electrode tab that is coupled to the electrode lead.

The separator is located between the positive electrode plate and the negative electrode plate to electrically insulate the positive electrode plate and the negative electrode plate from each other, and the separator may have a porous membrane shape to allow lithium ions to transfer between the positive electrode plate and the negative electrode plate. The separator may be made of, for example, a porous film using polyethylene (PE) or polypropylene (PP), or a composite film thereof.

The pouch case 11 is made of an exterior material having a multi-layered film form having a metal layer and a resin layer surrounding the metal layer, and the pouch case 11 may be composed of an upper case and a lower case.

If the pouch case 11 is composed of an upper case and a lower case as above, the lower case has an accommodation portion 11a convexly protruding to accommodate the electrode assembly. In addition, the upper case may have an accommodation portion 11a convexly protruding or have a flat shape at which the accommodation portion 11a is not formed.

In other words, the battery cell may be a both-surface protruding type battery cell that protrudes at both surfaces or a single-surface protruding type battery cell that protrudes only at one surface. In the drawings of the present disclosure, only a case where the battery cell is a one-surface protruding type cell is shown for convenience of illustration, but the present disclosure is not limited thereto.

Meanwhile, if the battery cell is a bi-directional protruding cell, the upper case and the lower case may have sealing portions 11b, 11c corresponding to the outer peripheral region of the accommodation portion 11a, respectively. In addition, if the battery cell is a unidirectional protruding cell, the lower case may have sealing portions 11b, 11c corresponding to the outer peripheral region of the accommodation portion 11a, and the upper case may have sealing portions 11b, 11c formed in a region that is in contact with the sealing portions 11b, 11c of the lower case.

The pouch case 11 accommodates the electrode assembly in the accommodation portion 11a, and the sealing portions 11b, 11c of the upper case and the lower case are abutted and sealed to each other by thermal fusing. The sealing portions 11b, 11c of the upper case and the lower case may be made of a resin material having a thermally fusing property so that they may be bonded to each other in a contacting state by thermal fusion.

The electrode lead 12 is connected to the electrode tab of the electrode assembly and is drawn out of the pouch case 11 to serve as a medium for electrically connecting the electrode assembly to an external component. The electrode lead includes a positive electrode lead connected to the positive electrode plate and a negative electrode lead connected to the negative electrode plate. In more detail, the positive electrode lead is connected to an uncoated positive electrode region provided at the positive electrode plate, and the negative electrode lead is connected to an uncoated negative electrode region provided at the negative electrode plate.

Meanwhile, the sealing portions 11b, 11c respectively include a terrace portion 11b located in a direction in which the electrode lead 12 is drawn out and a wing portion 11c located in a direction perpendicular to the drawn direction of the electrode lead 12.

Although not shown in the drawings, the wing portion 11c may be folded toward a side surface of the accommodation portion 11a for minimizing the volume of the battery cell 10. If the wing portion 11c is folded as above, the accommodation portion 11a and the wing portion 11c may be bonded to each other by an adhesive or the like.

The sealant 13 is interposed between the inner surfaces of the sealing portions 11b, 11c and the electrode lead 12 in order to prevent the sealing force between the electrode lead 12 drawn out of the pouch case 11 and the inner surfaces of the sealing portions 11b, 11c from being deteriorated.

Next, the cell stack employed at the battery module according to an embodiment of the present disclosure will be described in detail with reference to FIG. 4.

Figure 4:
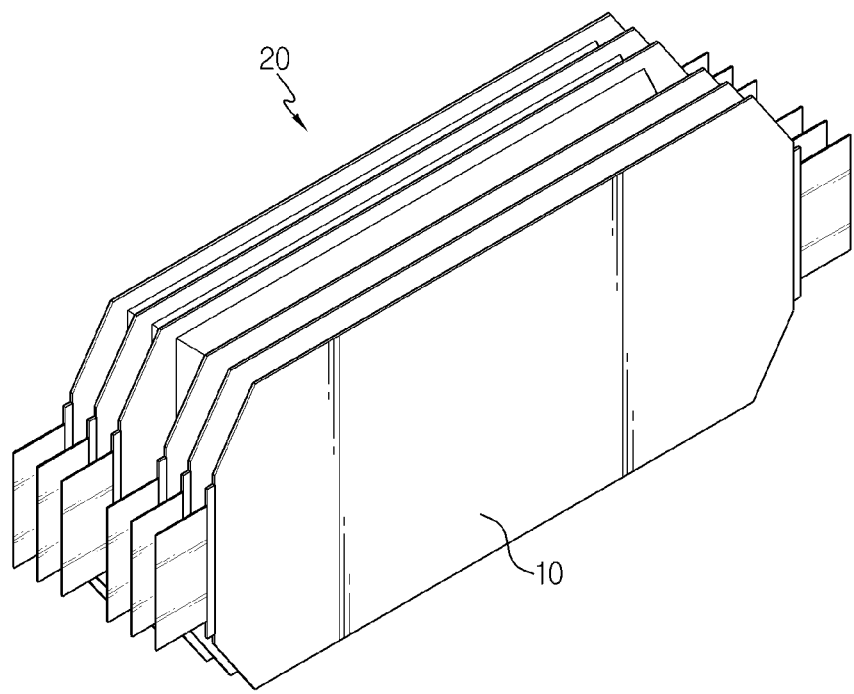
FIG. 4 is a perspective view showing a battery cell stack employed at the battery module according to an embodiment of the present disclosure.

FIG. 4 is a perspective view showing a battery cell stack employed at the battery module according to an embodiment of the present disclosure.

Referring to FIG. 4, the cell stack 20 is formed by stacking a plurality of battery cells 10 to face each other.

Even though the figures of the present disclosure just depict that one cell stack 20 is composed of six battery cells 10, this is merely an example, and the number of battery cells 10 configuring the cell stack 20 is not limited thereto. That is, the cell stack 20 applied to the present disclosure may be composed of various numbers of battery cells 10 as needed.

The battery cells 10 of the cell stack 20 may be fixed to each other by an adhesive and/or an adhesive tape applied between facing surfaces thereof. In addition, when each battery cell 10 of the cell stack 20 is a unidirectional protruding cell, the battery cells 10 may be arranged so that the accommodation portions 11a (see FIG. 3) thereof face the center of the cell stack 20. In this case, a pair of battery cells 10 positioned at the center of the cell stack 20 are arranged so that the accommodation portions 11a thereof are in contact with each other.

Next, the module frame 30 employed at the battery module according to an embodiment of the present disclosure will be described in detail with reference to FIGS. 5 to 7.

Figure 5:
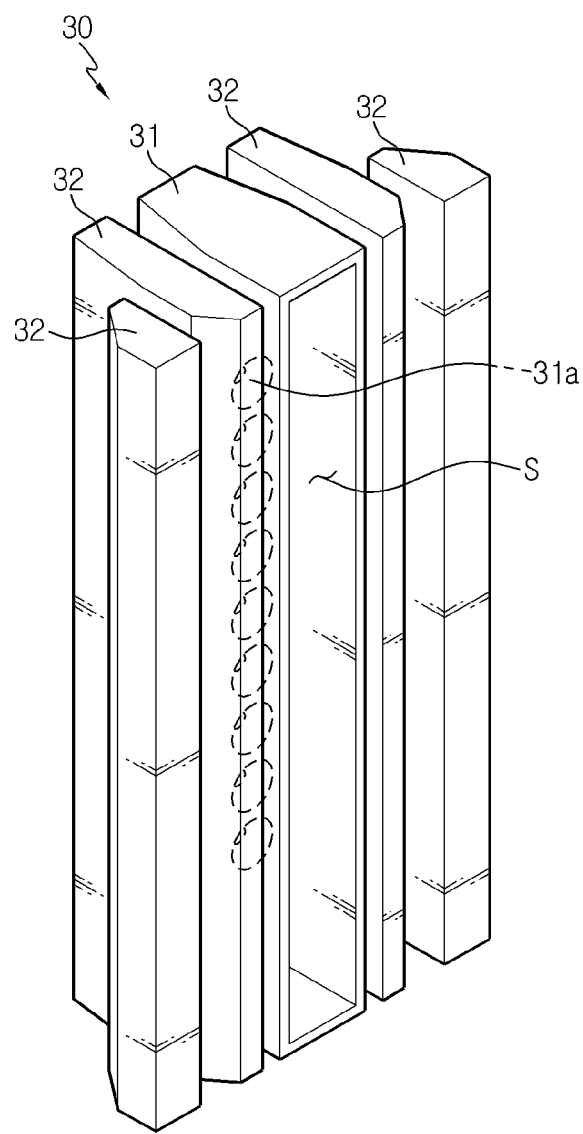
FIG. 5 is a perspective view showing a module frame employed at the battery module according to an embodiment of the present disclosure.
Figure 6:
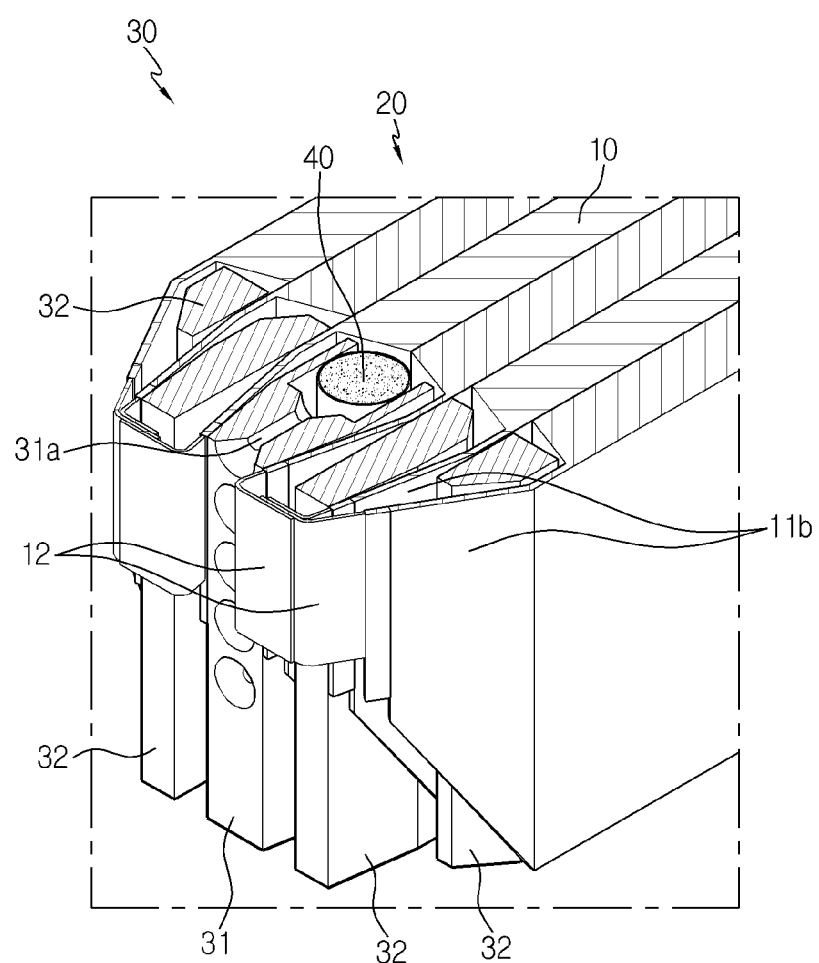
FIG. 6 is a partial cross-sectioned view, taken along the line A-A' of FIG. 2.
Figure 7:
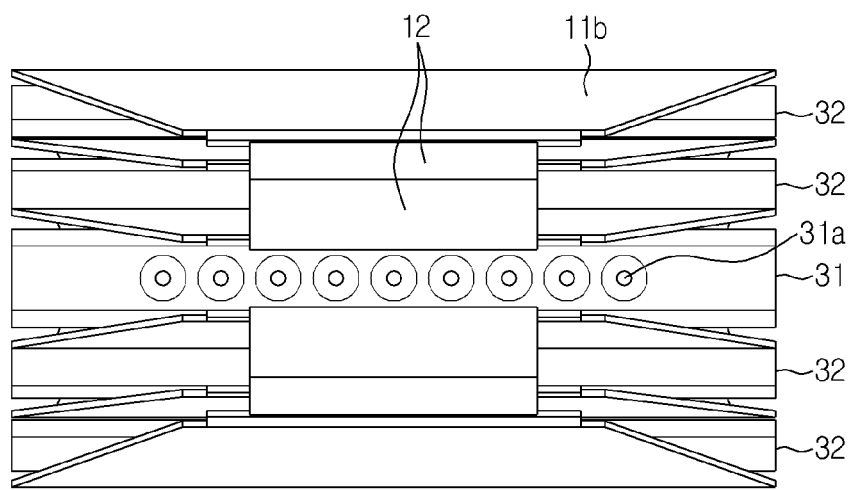
FIG. 7 is a plane view showing the battery module according to an embodiment of the present disclosure.
Figure 8:
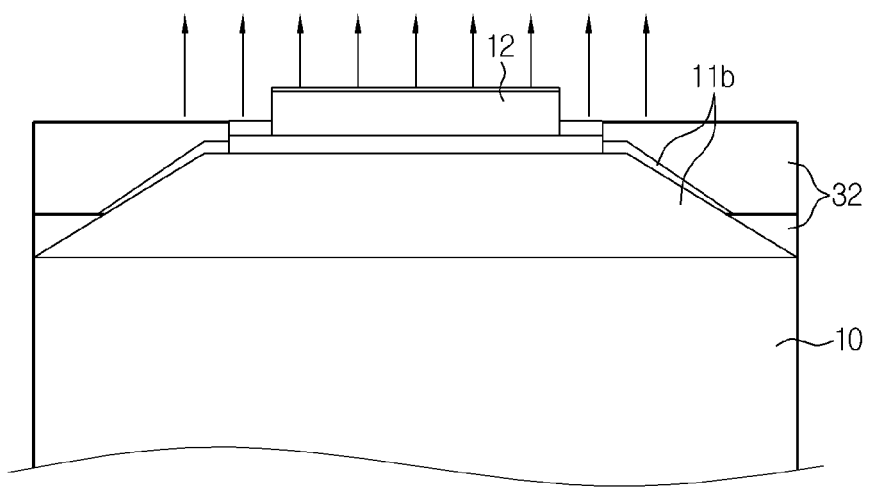
FIG. 8 is a diagram showing a direction of the fire extinguishing agent ejected by the operation of the fire extinguishing unit in the battery module according to an embodiment of the present disclosure.

FIG. 5 is a perspective view showing a module frame employed at the battery module according to an embodiment of the present disclosure, FIG. 6 is a partial cross-sectioned view, taken along the line A-A' of FIG. 2, and FIG. 7 is a plane view showing the battery module according to an embodiment of the present disclosure.

Referring to FIGS. 5 to 7, the module frame 30 includes one main frame 31 and a plurality of sub frames 32 located at both sides of the main frame 31.

The module frame 30 is coupled to one side or both sides of the cell stack 20 to support the terrace portion 11b and the electrode lead 12 of the battery cell 10 and also gives an accommodation space for the fire extinguishing unit 40.

In the module frame 30, the main frame 31 and the sub frames 32 may be connected to each other. Alternatively, the main frame 31 and the sub frames 32 may be separated from each other.

The main frame 31 is disposed on a placing surface where the accommodation portions 11a of the pair of battery cells 10 located at the center of the cell stack 20 in the stacking direction encounter each other, namely side surfaces of the pair of battery cells 10 located at the center of the cell stack 20 in the stacking direction. The main frame 31 has a plurality of ejection holes 31a formed along the width direction of the battery cell 10, namely the length direction of the main frame 31. In addition, the main frame 31 has an accommodation space S formed therein to accommodate the fire extinguishing unit 40.

When the main frame 31 is coupled to the cell stack 20, it is preferable that the accommodation space S accommodating the fire extinguishing unit 40 is kept sealed so as not to communicate with the outside except for the ejection holes 31a. This is to increase the ejection pressure when a fire extinguishing agent, explained later, is ejected.

The ejection hole 31a may have a tapered shape so that its outlet portion becomes wider in an upper direction. If the ejection hole 31a is shaped in this way, the ejection range becomes wider when the fire extinguishing agent is injected, thereby maximizing the fire extinguishing effect.

The sub frames 32 are disposed at both sides of the main frame 31 and are disposed on the side surface of the accommodation portion 11a of the battery cells 10 to support the terrace portion 11b and the electrode leads 12.

In other words, the electrode leads 12 located at one side based on the main frame 31 are coupled to each other to form one electrode lead assembly, and the electrode leads 12 located at the other side opposite to the above side based the main frame 31 are coupled to each other to form another electrode lead assembly. Here, the sub frames 32 may serve as a support structure for allowing the electrode lead assemblies to maintain a stable coupled state.

Next, the fire extinguishing unit 40 employed at the battery module according to an embodiment of the present disclosure will be described in detail with reference to FIG. 6.

Referring to FIG. 6, the fire extinguishing unit 40 is accommodated inside the module frame 30, particularly inside the main frame 31, and is disposed in a central portion at one side of the cell stack 20 to eject the fire extinguishing agent at a reference temperature or above, thereby preventing the occurrence of a fire in advance.

More specifically, the fire extinguishing unit 40 is accommodated in the accommodation space S (see FIG. 5) formed inside the main frame 31, and is disposed on the side surfaces of the accommodation portions 11a of the pair of battery cells 10 respectively positioned at a central portion in the stacking direction among the battery cells 10 of the cell stack 20. Since the location of the fire extinguishing unit 40 is adjacent to the electrode lead 12 having a relatively large amount of heat generation in the battery cell 10, the fire extinguishing unit 40 disposed at the position allows the fire extinguishing unit 40 to quickly operate according to temperature rise.

The fire extinguishing unit 40 is configured so that the fire extinguishing agent in a powder or liquid form is evaporated at the reference temperature or above to expand and thus is ejected with a high pressure. In other words, the fire extinguishing unit 40 includes an accommodation container made of a resin that maintains a sealed state at a normal use temperature of the battery module and is melted and broken at the reference temperature or above, and a fire extinguishing agent in a powder or liquid form accommodated therein.

The fire extinguishing agent applied in the present disclosure may be selected from a variety of fire extinguishing agents commonly used for fire extinguishing without limitation, and the fire extinguishing principle is also capable of adopting extinguishment by smothering, cooling fire extinguishment, or both of them.

If the temperature of the battery module rises due to an abnormal use state such as the occurrence of a short circuit and thus the accommodation container is melted and broken since the temperature at a location where the fire extinguishing unit 40 is disposed rises over the reference temperature, the fire extinguishing agent therein is ejected by the strong pressure, thereby extinguishing fire or blocking ignition.

The accommodation container may be filled with the gas at high pressure in addition to the fire extinguishing agent so that the fire extinguishing agent may be ejected out of the broken accommodation container by strong pressure at a certain temperature or above. In this case, the gas expanded according to the temperature rise applies a high pressure to the inner wall of the accommodation container. If the temperature reaches a melting point of the accommodation container, the melted and weakened accommodation container is broken and the fire extinguishing agent may be ejected together with the gas filled in the accommodation container.

Meanwhile, the battery module according to one embodiment of the present disclosure described above may be accommodated in a pack housing (not shown) to configure a single battery pack.

In other words, a battery pack according to an embodiment of the present disclosure includes at least one battery module according to an embodiment of the present disclosure, and the battery module(s) may be accommodated in a pack housing.

The battery pack according to an embodiment of the present disclosure has a structure capable of extinguishing a fire or preventing a fire ignition by injecting the fire extinguishing agent through the ejection holes 31a when the temperature in the pack housing rises to the reference temperature or above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   a cell stack formed by stacking a plurality of battery cells, each battery cell having an accommodation portion, a sealing portion and an electrode lead extending from the sealing portion;
   a module frame coupled to one side or both sides of the cell stack; and
   a fire extinguisher accommodated between sealing portions of two battery cells and configured to eject a fire extinguishing agent at or above a reference temperature.

2. The battery module according to claim 1, wherein the module frame includes:
   a main frame disposed at a center of the cell stack to accommodate the fire extinguisher; and a plurality of sub frames disposed at both sides of the main frame and each subframe being interposed between adjacent battery cells.

3. The battery module according to claim 2, wherein the main frame has a plurality of ejection holes configured to allow the fire extinguishing agent to be ejected, wherein the accommodation portions of the plurality of battery cell are below the fire extinguisher, and wherein the plurality of ejection holes are directed away from the accommodation portions of the plurality of battery cells.

4. The battery module according to claim 3, wherein the ejection holes have a tapered shape so that an outlet portion thereof is wider in an upper direction.

5. The battery module according to claim 2, wherein each sub frame supports the sealing portion and the electrode lead of a respective battery cell.

6. The battery module according to claim 2, wherein the fire extinguisher comprises a fire extinguishing agent in a space formed in the main frame and the main frame contacts the accommodation portions of two battery cells located at a center portion among the plurality of battery cells of the cell stack.

7. The battery module according to claim 1, wherein the fire extinguisher includes:

a fire extinguishing agent configured to evaporate at or above the reference temperature; and an accommodation container configured to accommodate the fire extinguishing agent and break at or above the reference temperature.

8. A battery pack, comprising:

at least one battery module according to claim 1; and a pack housing configured to accommodate the at least one battery module.

9. The battery module according to claim 2, wherein the plurality of sub frames comprises a first sub frame and a second sub frame, and wherein the sealing portion of a first of the plurality of battery cells extends between the first sub frame and the main frame and the sealing portion of a second of the plurality of battery cells extends between the second sub frame and the main frame.

10. The battery module according to claim 1, wherein the electrode leads extend over a top surface of the fire extinguisher.

11. The battery module according to claim 1, wherein the fire extinguisher is above the accommodation portions and electrode leads of the plurality of battery cells.

* * * * *